United States Patent [19]
Wiggers et al.

[11] Patent Number: 5,176,246
[45] Date of Patent: Jan. 5, 1993

[54] PADDED CHAIN DRIVE FOR ROLLER CONVEYORS

[75] Inventors: Dennis Wiggers; Roger L. Alderink, both of St. Louis County, Mo.

[73] Assignee: Alvey, Inc., St. Louis, Mo.

[21] Appl. No.: 844,116

[22] Filed: Mar. 2, 1992

[51] Int. Cl.$^5$ .............................................. B65G 13/07
[52] U.S. Cl. ...................................... 198/790; 198/789
[58] Field of Search ................. 198/789, 790, 833, 851

[56] References Cited

U.S. PATENT DOCUMENTS

| | | | |
|---|---|---|---|
| 3,306,430 | 2/1967 | Fogg | 198/790 |
| 4,074,805 | 2/1978 | Bodewes | 198/790 |
| 4,273,239 | 6/1981 | Thwaites et al. | 198/790 |
| 4,458,809 | 7/1984 | White | 198/790 |
| 4,570,780 | 2/1986 | Thwaites et al. | 198/790 X |
| 4,753,339 | 6/1988 | Vogt et al. | 198/790 X |

Primary Examiner—D. Glenn Dayoan
Attorney, Agent, or Firm—Polster, Lieder, Woodruff & Lucchesi

[57] ABSTRACT

A load supporting conveyor having live rollers forming a load conveying path in which the rollers are driven by a chain having horizontally placed links and vertically positioned rollers with vertical axles that project upwardly toward the live rollers to be engaged by a flexible pad substantially aligned with the drive chain and an aperture pattern formed in the pad to establish a series of apertures that have a tight fit with certain ones of the vertical axle projections and a series of other apertures that have a loose fit with a like series of vertical axle projections.

8 Claims, 2 Drawing Sheets

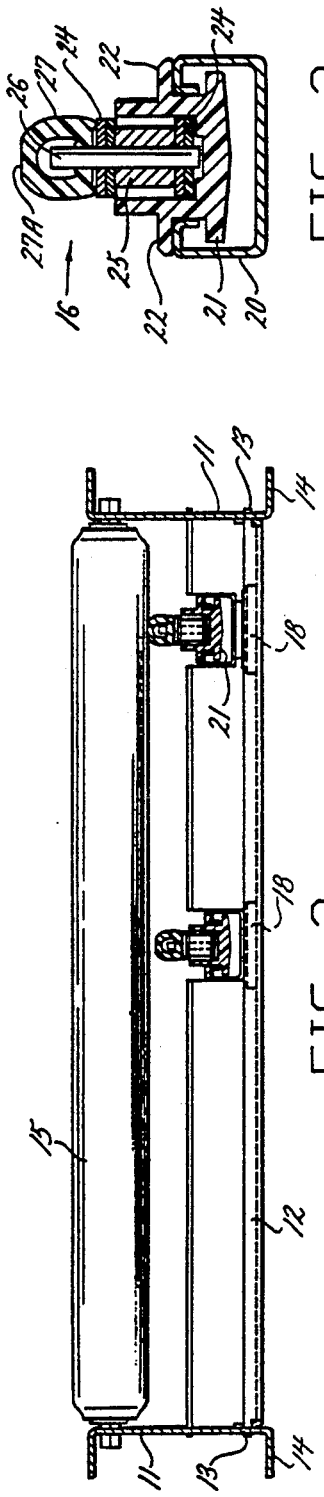
FIG. 2
(PRIOR ART)
FIG. 3
(PRIOR ART)
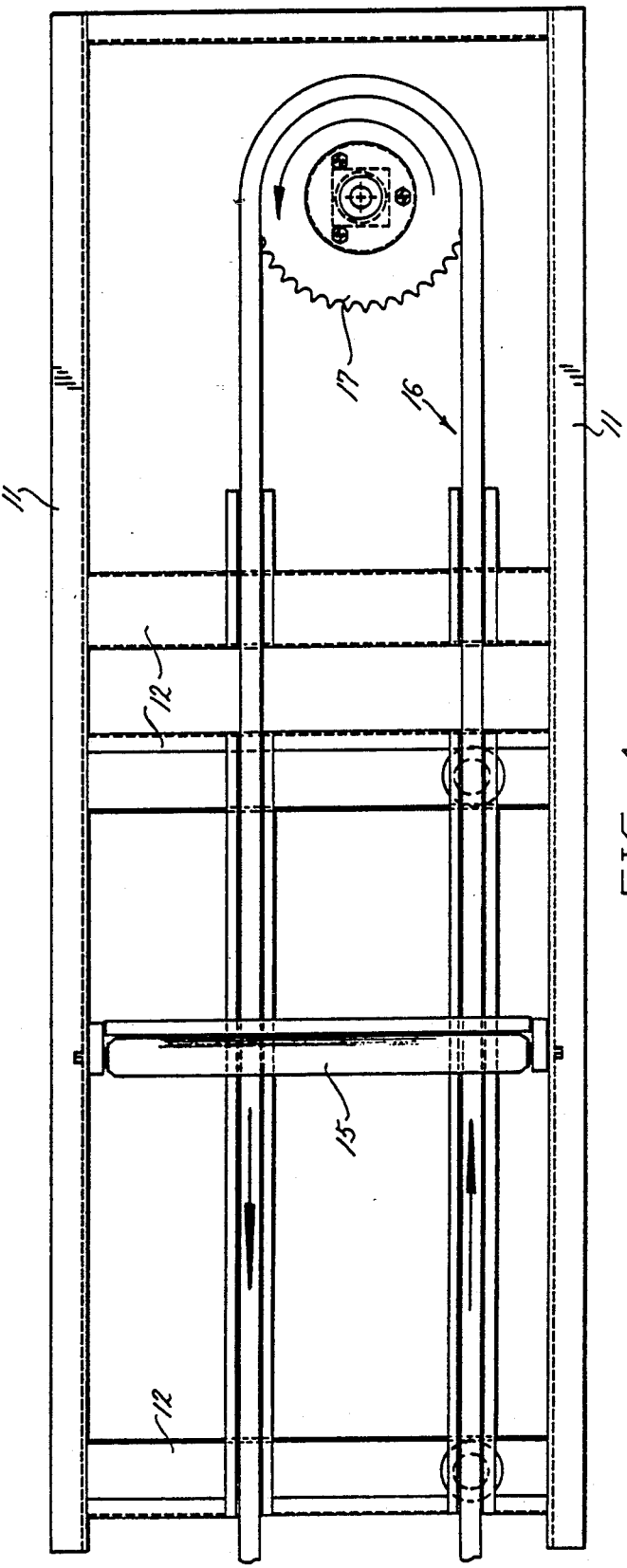
FIG. 1
(PRIOR ART)

PADDED CHAIN DRIVE FOR ROLLER CONVEYORS

BACKGROUND OF THE INVENTION

1. Field of the Invention

The present invention relates to live roller conveyors having a unique assembly of padding carried on a chain adapted to drive the conveyor rollers.

2. Description of the Prior Art

Well known arrangements for transporting articles on a roller conveyor have been provided with rope type means for driving the article supporting rollers. Examples of such arrangements are seen in Hohl U.S. Pat. No. 3,040,872 of Jun. 26, 1962, Vogt U.S. Pat. No. 3,158,252 of Nov. 24, 1964, Sullivan U.S. Pat. No. 3,176,828 of Apr.26, 1965, Fleischauer U.S. Pat. No. 3,621,982 of Nov. 23, 1971, Werntz U.S. Pat. No. 4,117,923 of Oct. 3, 1978, Thwaites et al U.S. Pat. No. 4,273,239 of Jun. 16, 1981 and Turnbough U.S. Pat. No. 4,319,675 of Mar. 16, 1982.

In these examples of the prior art, the orientation of the drive rope followed conventional practice, that is, the rollers have horizontal axes and the drive rope is movable in a vertical plane. In the examples where the article supporting rollers are driven by direct-contact with rope or other friction means, the support of such means has presented problems to obtain uniform contact with a span of rollers.

Variations from rope drives for roller conveyors are exhibited in patents issued to Fogg U.S. Pat. No. 3,306,430 of Feb. 28, 1967, Bodewes U.S. Pat. No. 4,074,805 of Feb. 21, 1978, Turnbough et al U.S. Pat. No. 4,392,568 of Jul. 12, 1983, Bowman et al U.S. Pat. No. 4,441,607 of Apr. 10, 1984, White et al U.S. Pat. No. 4,458,809 of Jul. 10, 1984, and Abell U.S. Pat. No. 4,588,073 of May 13, 1986.

There are other problems presented by the foregoing prior art examples. In the rope drive the support of the rope is very important, and obtaining uniform contact is difficult when long stretches of conveyor runs are required. Then again, the rope stretch that occurs over time adds to the problem of maintaining contact. In the examples where roller chains are used to support friction pads or strips, the problems that are encountered are related to the contact between the axles for the rollers in the chain and the pads so that the teeth of the chain drive sprocket do not interfere with the manner of attaching the pads. The foregoing are some of the problems which become evident upon inspection of the prior art disclosures.

In the above examples of prior art, some problems have arisen, especially with the use of the elastomer material commonly chosen for the high friction pad which will distort when the series of holes in the pad to receive the roller axles does not exactly match the distance between the protruding axles in the drive chain. The dissimilar distance can be a result of inaccurate manufacturing processes or a result of fluctuating temperature. There is a large difference in the way the elastomer pad changes dimensionally with temperature changes when compared to dimensional changes in the metal used in the drive chain over the same temperature change. The dissimilar distance causes a build up of internal stresses in the elastomer pad. The result of internal stress can range from pad distortion up to material failure. Pad distortion can cause a wavy pattern along the length of pad and that, in turn can cause unwanted side loading on the chain guide track. Pad distortion can also cause a wavy pattern along the top surface of the pad which contacts the bottom of the rollers causing excess noise and vibration.

The problem associated with the Abell patent U.S. Pat. No. 4,588,073 drive is that the chain supported pads are difficult to maintain uniform roller contact due to thermal conditions which the conveyors encounter or are intended to be subjected to, as well as the effect such thermal conditions have on the conveyor assembly.

BRIEF DESCRIPTION OF THE INVENTION

The embodiment presently preferred to exemplify the uniqueness of the invention comprises a link chain supporting a system of pads of high friction characteristics in which the chain links are oriented in horizontal planes while the load carrying rollers have their axes also horizontal so the rollers form a horizontal roller path for the load to be conveyed. The chain links are secured by vertically directed axles for the rollers in the chain so that the axles extend vertically and certain axles serve to engage in holes in the friction pad. The pad which drives the load bearing rollers may be continuous for average conveyor runs, or may be applied in suitable lengths for long conveyor runs. The chain links as well as the friction pad are capable of flexing around curves to establish the path of travel for the load.

It is an object of the invention to coordinate the drive chain associated with a roller drive padding of a conveyor so that the difference in the way the material of the chain and the material of the pad reacts to thermal conditions can result in overcoming inconsistent roller drive response, as well as a disturbing degree of noise during conveyor operation.

A further object of the invention is to effect a drive connection between the drive chain links and the roller drive padding that will compensate for the thermal working conditions between metallic chain links and non-metallic padding materials.

In compensating for the thermal conditions encountered in operating a conveyor system have the preferred characteristics of metallic and non-metallic components, it is an object to establish suitable spaced points of contact between the chain drive and the padding that are sufficiently spaced so that the padding between the contact points can be relatively free to float for the purpose of limiting distortions in the shape of the padding for both vertical and horizontal directions of distortions.

These and other objects of the invention will be set forth in the following specifications.

BRIEF DESCRIPTION OF THE DRAWINGS

A preferred embodiment of the invention is set forth in the following drawings, wherein;

FIG. 1 is a fragmentary plan view of the prior art conveyor showing the drive assembly for the load supporting rollers and a sprocket to reverse the direction of travel of the drive assembly;

FIG. 2 is an enlarged transverse sectional view of the drive assembly as seen along line 2—2 in FIG. 1;

FIG. 3 is an enlarged sectional detail of the mounting of the pad on the roller chain which is typical of the prior art;

DETAILED DESCRIPTION OF THE EMBODIMENT

Figure 4:
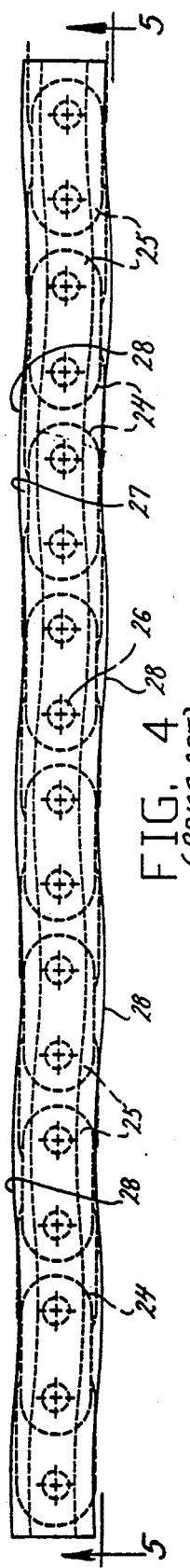
FIG. 4 is a plan view of a fragmentary portion of the drive assembly to illustrate a problem present in the prior art.

Referring now to FIG. 1, the general construction of a load transportation conveyor 10 has been illustrated at the end portion where the drive mechanism for the load bearing rollers is shown. The conveyor includes special channel-shaped side rail 11 held in spaced parallel positions by spaced channels 12 which are secured (see FIG. 2) to the vertical webs of the side rails 11 by tabs 13 that engage in the webs just above the bottom outturned flange 14 of the side rails 11. While FIG. 1 does not show a complement of load supporting rollers 15, it is intended to show in a schematic way the drive for the rollers 15 which include an approaching length of a drive assembly 16 and a return length of that same drive assembly after these lengths have passed around a driven sprocket 17.

The view of FIG. 2 shows a transverse sectional elevations of the construction of FIG. 1. In this view the side rails 11 support load carrying rollers 15 which are mounted with the projecting axles resting in slots on the side rails 11. The spacer channels 12 are seen to support lifting means 18 of a well known character in which the drive assembly 16 is associated for the purpose of lifting or lowering the drive assembly 16. It is normally operated so that the right hand lifts 18 is actuated to raise its roller drive assembly into contact with the under side of the load supporting rollers 15.

In the prior art conveyor 10, seen in FIG. 1, 2 and 3, the drive assembly in FIG. 3 embodied a guide track 20 which extends continuously along the conveyor length. The guide track carries an equally elongated low friction track 21 which is formed with flanges 22 projecting laterally to embrace the side walls of the guide track 20. The roller chain drive assembly 16 embodies a system of side links 24 which are oriented in horizontal planes with roller elements 25 captured between the links by vertically directed axles 26, thereby, allowing the chain assembly to follow a path which traverses the driver sprocket 17. In this prior art arrangement, each axle 26 for the roller elements 25 is elongated so its upper end is exposed to a suitable extent to be inserted into apertures in the bottom of the elongated high friction drive pad 27. The pad is hollow so that the upper surface 27A is able to flex when it is lifted by means 17 to engage the under side of the load supporting rollers 15. The pad 27 can be provided with apertures for the axles 26 of each chain roller to thereby maintain a better contact over the pad flexure as it transverses the driver sprocket 17.

Figure 5:
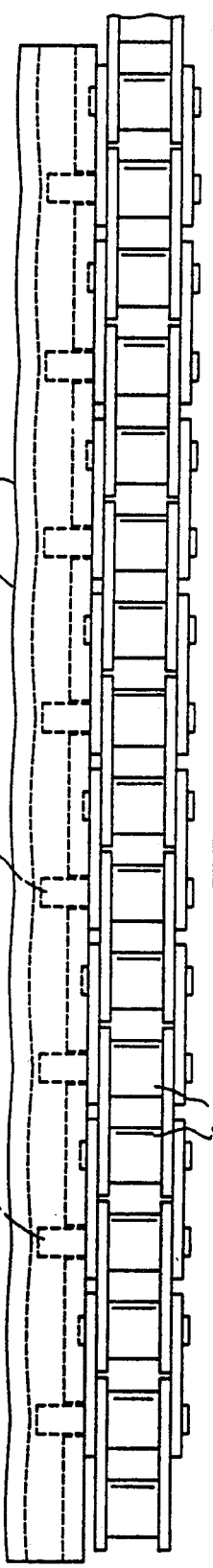
FIG. 5 is a fragmentary side elevation of a portion as seen along line 5—5 in FIG. 4.

After extensive use of the prior art conveyor assembly shown in FIGS. 1-5, it became evident that problems continued to exist in the noise that was generated during operations at the desired speeds, and that there was a continuing excessive power surge during operations. After much investigations, it was discovered that the close connections of the protruding axles at each chain roller elements 25 with the elongated pad 27 was forcing the pad 27 to change its shape in both the horizontal and vertical directions as is illustrated in FIG. 4 and 5 respectively. The horizontal deflection 28 (see FIG. 4) was found to be responsible for the excessive noise in the conveyor by reason of the bottom side links 24 undergoing shifting and rubbing on the guide track 21. On the other hand, the pad 26 was undergoing vertical deformations at 29 as shown in FIG. 5 which affected the uniform movement of loads on the rollers 15.

Figure 6:
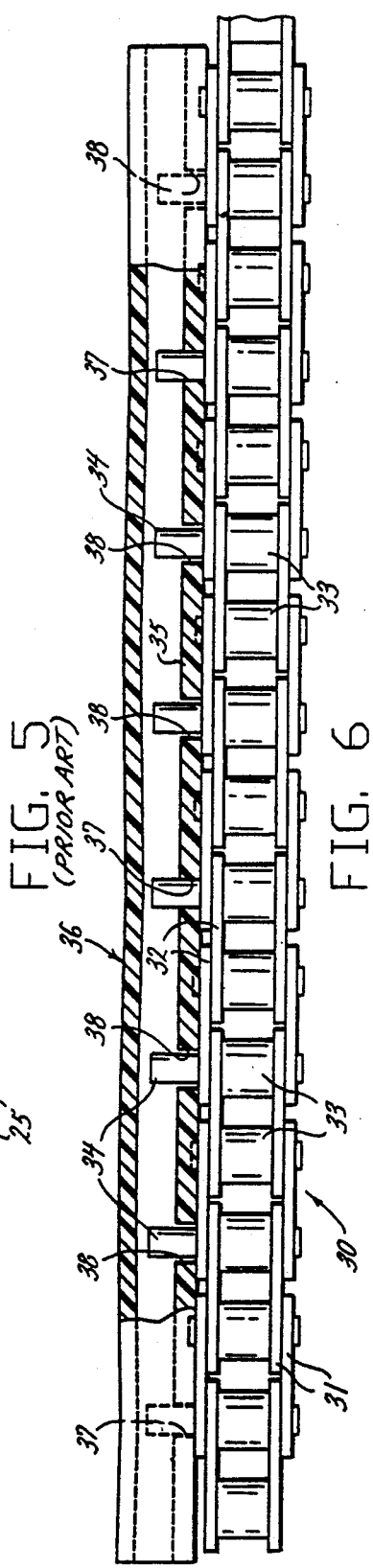
FIG. 6 is a fragmentary side view of fragmentary section showing the improvement herein.
Figure 7:
FIG. 7 is a plan view of the showing in FIG. 6 to illustrate a further feature of the improvement herein.

Turning now to FIG. 6, there is shown in fragmentary vertical sections a portion of a conveyor assembly which depicts the solution to the problems in the prior art. As seen, the roller chain 30, composed of bottom links 31 and upper link 32, and rollers 33 set between the links 31 and 32, there is disclosed the vertically extruding roller axles 34. These axles extend through the bottom wall 35 of the hollow pad 36. That roller chain supports and drives the hollow pad 36 through an arrangement of employing a first series of closely fitted aperture 37 in the bottom wall 35 so there is obtained a positive drive engagement with the pad 36 by the axles 34. The bottom wall 35 of the hollow pad 36 is formed with a second series of loosely fitted apertures 38 so there is the ability of the pad lengths adjacent to loose aperture 38 to float in directions to avoid constraining the pad to a fixed connection with all of the vertically extending axles 34. In the view of FIG. 6, the pattern of closely fitted and loosely fitted apertures 37 and 38 respectively, is one in which each closely fitted apertures 37 is related at each side with a loosely fitted aperture 38.

The object of close fitted and loose fitted apertures 37 and 38 is to provide a desired number of positive drive connections between the pad and drive roller chain to avoid stressing the material of the pad 36, and at the same time allowing the pad to adapt itself to the operating temperature in the conveyor environment. Furthermore, the pattern of apertures will compensate for the difference in the coefficients of thermal expansions and contractions between metal of the chain links 31 and 32 and the non-metallic material of pad 36.

For example, the metal chain links 31 and 32 have a coefficient of thermal expansion of the order of $6.0 \times 10^6$ in/in° F. or $10.8 \times 10^6$ m/m/° C. The pad material chosen is urethan which has a coefficient of thermal expansion of the order of $95.0 \times 10^6$ in/in/° F. or $171.0 \times 10^6$ m/m/° C. That difference is considerable and is believed to be the cause of the pronounced vertical and horizontal distortion shown in the prior art of FIGS. 4 and 5.

When preparing the pad 36 for assembly on the vertically extending axles 34 from the rollers in the drive chain, a preferred pattern calls for the small close fitted apertures 37 to be formed by using a drill bit size 0.203 which forms a hole size of 0.190 in. The large apertures 38 are formed by a drill bit size 0.215 which forms a hole size of 0.205 in. While the aperture or hole size pattern can be one small aperture between a pair of large apertures, the pad material can have a desired degree of floating response relative to each tight fitted aperture. Other aperture size patterns can be employed, depending on the conditions in which the conveyor is intended to operate. In any selections of aperture patterns, it is usually assumed that the roller axles 34 are each of a uniform diameter. A criteria for aperture pattern is that the frequency of tight fitted apertures should be sufficient to obtain the desired pad drive without imposing stress in the pad. The pattern of loose fitting apertures should be based on the need to maintain the pad in a linear alignment over the drive chain while allowing the pad to float as needed between tight fitted apertures. Thus, two or more loose fitting apertures between tight fitting apertures can be allowed.

The embodiments of the invention in which an exclusive property is desired are defined hereinafter as follows.

What is claimed is:

1. A roller conveyor for the transportation of a load having rollers having forming a path for the travel of a load, a drive chain extending along the load moving path of rollers, and friction means engaged on the drive chain in position to contact the rollers for effecting the travel of a load, characterized in that the engagement between the friction means and the drive chain comprises a series of spaced projections on the drive chain, and a series of apertures formed in the friction means to receive the projections in which certain of the series of apertures are tightly fitted over a like series of projections on the drive chain, and others of the apertures in the friction means are loosely fitted over others of the projections on the drive chain.

2. The roller conveyor set forth in claim 1 characterized in that the series of apertures formed in the friction means having tight fit over projections on the drive chain alternate with the loose fit of others of the apertures over projections on the drive chain.

3. The roller conveyor set forth in claim 1 characterized in that the series of apertures formed in the friction means having a tight fit over projections on the drive chain are spaced along the drive chain such that pairs of loose fitted apertures in the friction means intervene between the tight fitted apertures for loose fit over like pairs of projections on the drive chain.

4. The roller conveyor set forth in claim 1 characterized in that the drive chain is composed of metallic components including the spaced projections thereon, the friction means is composed of a non-metallic flexible material, the series of apertures in the non-metallic flexible material include certain ones that fit tightly over like certain one of the projections on the drive chain, and other ones of the apertures in the non-metallic flexible material fit loosely over like ones of the projections on the drive chain.

5. The roller conveyor set forth in claim 4 characterized in that the drive chain metallic components, and the non-metallic flexible material have different coefficient of thermal expansion, and said loose fit of the other ones of the apertures in the non-metallic flexible material compensate for the different coefficient of thermal expansion to maintain alignment of the non-metallic flexible material with the metallic components of the drive chain.

6. A roller conveyor for the transportation of a load having a path of travel of the load defined by load supporting rollers, a driver chain extending along beneath the load supporting rollers, and friction means supported on the driver chain in position to engage the load supporting rollers, characterized in that the driver chain presents a series of spaced and similarly sized projections directed toward the load supporting rollers, and the friction means is formed with a pattern of apertures fitted onto the series of spaced projections on the driver chain wherein the pattern of apertures include certain ones having a size to tightly fit over like ones of projections on the driver chain, and other apertures having a size to loosely fit over like others of projections on the driver chain, and the tightly fit ones serve to propel the friction means and the loosely fit ones serve to maintain the friction means in substantial alignment with the driver chain.

7. The roller conveyor set forth in claim 6 characterized in that the pattern of apertures formed in the friction means includes more loosely fitted apertures than tightly fitted apertures.

8. The roller conveyor set forth in claim 6 characterized in that the pattern of apertures formed in the friction means includes at least a pair of loosely fitted apertures between each tightly fitted apertures.

* * * * *